US010647579B2

(12) United States Patent
Kang et al.

(10) Patent No.: US 10,647,579 B2
(45) Date of Patent: May 12, 2020

(54) CARBON NANOTUBE PELLETS AND METHOD FOR MANUFACTURING SAME

(71) Applicant: LG CHEM, LTD., Seoul (KR)

(72) Inventors: Kyung Yeon Kang, Daejeon (KR); Jihee Woo, Daejeon (KR); Seungyong Lee, Daejeon (KR); Hyungsik Jang, Daejeon (KR); Dong Hyun Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 77 days.

(21) Appl. No.: 15/746,945

(22) PCT Filed: Oct. 17, 2016

(86) PCT No.: PCT/KR2016/011616
§ 371 (c)(1),
(2) Date: Jan. 23, 2018

(87) PCT Pub. No.: WO2017/126777
PCT Pub. Date: Jul. 27, 2017

(65) Prior Publication Data
US 2019/0135634 A1    May 9, 2019

(30) Foreign Application Priority Data
Jan. 20, 2016   (KR) .................. 10-2016-0006986

(51) Int. Cl.
*C01B 32/174*   (2017.01)
*B30B 11/24*    (2006.01)
(Continued)

(52) U.S. Cl.
CPC ............. *C01B 32/174* (2017.08); *B01F 7/08* (2013.01); *B30B 11/22* (2013.01); *B30B 11/24* (2013.01);
(Continued)

(58) Field of Classification Search
CPC ... C01B 32/174; C01B 32/168; C01B 32/158; C01B 32/159; C01B 32/16;
(Continued)

(56) References Cited

U.S. PATENT DOCUMENTS 3,445,090 A * 5/1969 Lucke ..................... B01F 7/166
366/266
6,099,965 A * 8/2000 Tennent .................. B01J 20/20
264/29.1

(Continued)

FOREIGN PATENT DOCUMENTS

CN    102617908 A    8/2012
CN    104884243 A    9/2015
(Continued)

OTHER PUBLICATIONS

"CELLOSOLVE," accessed online at http://tmsearch.uspto.gov/bin/showfield?f=doc&state=4801:1qe8xe.2.2 on Sep. 19, 2019 (Year: 2019).*

(Continued)

*Primary Examiner* — Daniel C. McCracken
(74) *Attorney, Agent, or Firm* — Dentons US LLP

(57) ABSTRACT

The method for producing carbon nanotube pellets according to the present invention can reduce the particle size of the carbon nanotubes contained in the pellet by a repetitive extrusion process to produce pellets having improved dispersion characteristics in a solvent. The present invention can improve the problems of the change of the content generated by scattering of powders and safety issues by using carbon nanotubes in the form of pellet. And since the density of the pellet form is higher than that of the powder form, transport, transfer and improvement become easier. Therefore, it can be more effectively applied to the manufacturing of composite materials.

10 Claims, 11 Drawing Sheets

(51) Int. Cl.
B01F 7/08 (2006.01)
B30B 11/22 (2006.01)
C01B 32/168 (2017.01)

(52) U.S. Cl.
CPC ........ *C01B 32/168* (2017.08); *C01P 2002/30* (2013.01); *C01P 2004/61* (2013.01); *C01P 2006/22* (2013.01)

(58) Field of Classification Search
CPC ... C01B 32/162; C01B 32/164; C01B 32/166; C01B 32/17; C01B 32/172; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B30B 11/24; B30B 11/22; C01P 2002/30; C01P 2004/61; C01P 2006/22; B01F 7/08
See application file for complete search history.

(56) References Cited

U.S. PATENT DOCUMENTS

| | | | |
|---|---|---|---|
| 9,896,565 B2 | 2/2018 | Nosker et al. | |
| 2003/0180951 A1* | 9/2003 | Bullock | C12N 15/8207 435/468 |
| 2011/0110843 A1 | 5/2011 | Pasquali et al. | |
| 2013/0207051 A1 | 8/2013 | Ryu et al. | |
| 2015/0267030 A1 | 9/2015 | Nosker et al. | |
| 2019/0062521 A1 | 2/2019 | Nosker et al. | |

FOREIGN PATENT DOCUMENTS

| | | |
|---|---|---|
| JP | 2009-184851 A | 8/2009 |
| JP | 2011-502925 A | 1/2011 |
| JP | 2012-056789 A | 3/2012 |
| JP | 2014-101249 A | 6/2014 |
| JP | 2015-509474 A | 3/2015 |
| KR | 10-2010-0100847 A | 9/2010 |
| KR | 10-2011-0065704 A | 6/2011 |
| KR | 10-1197288 B1 | 11/2012 |
| KR | 10-2013-0103137 A | 9/2013 |
| KR | 10-2014-0049859 A | 4/2014 |
| WO | 2015084139 A1 | 6/2019 |

OTHER PUBLICATIONS

Sennett, et al., Dispersion and Alignment of Carbon Nanotubes in Polycarbonate, Mat. Res. Soc. Symp. Proc. 2002; 706: Z3.31.1-Z3.31.6 (Year: 2002).*

"White Spirit," accessed online at https://en.wikipedia.org/wiki/White_spirit on 20 Sep. 20, 2019 (Year: 2019).*

Database WPI: "Preparing compressed carbon nanotube comprises weighing carbon nanotube powder and solvent and then mixing, patterning and shaping the slurry to obtain a carbon nanotube pellet, and removing solvent from the pellet by drying", XP002786390, Thomson Scientific, Apr. 28, 2014 (Corresponds to KR10-2014-0049859A—submitted on Jan. 23, 2018).

Sennett et al.: "Making Functional Materials with Nanotubes—Dispersion and Alignment of Carbon Nanotubes in Polycarbonate", Materials Research Society Symposium Proceedings, vol. 706, pp. 97-102 (2002).

* cited by examiner

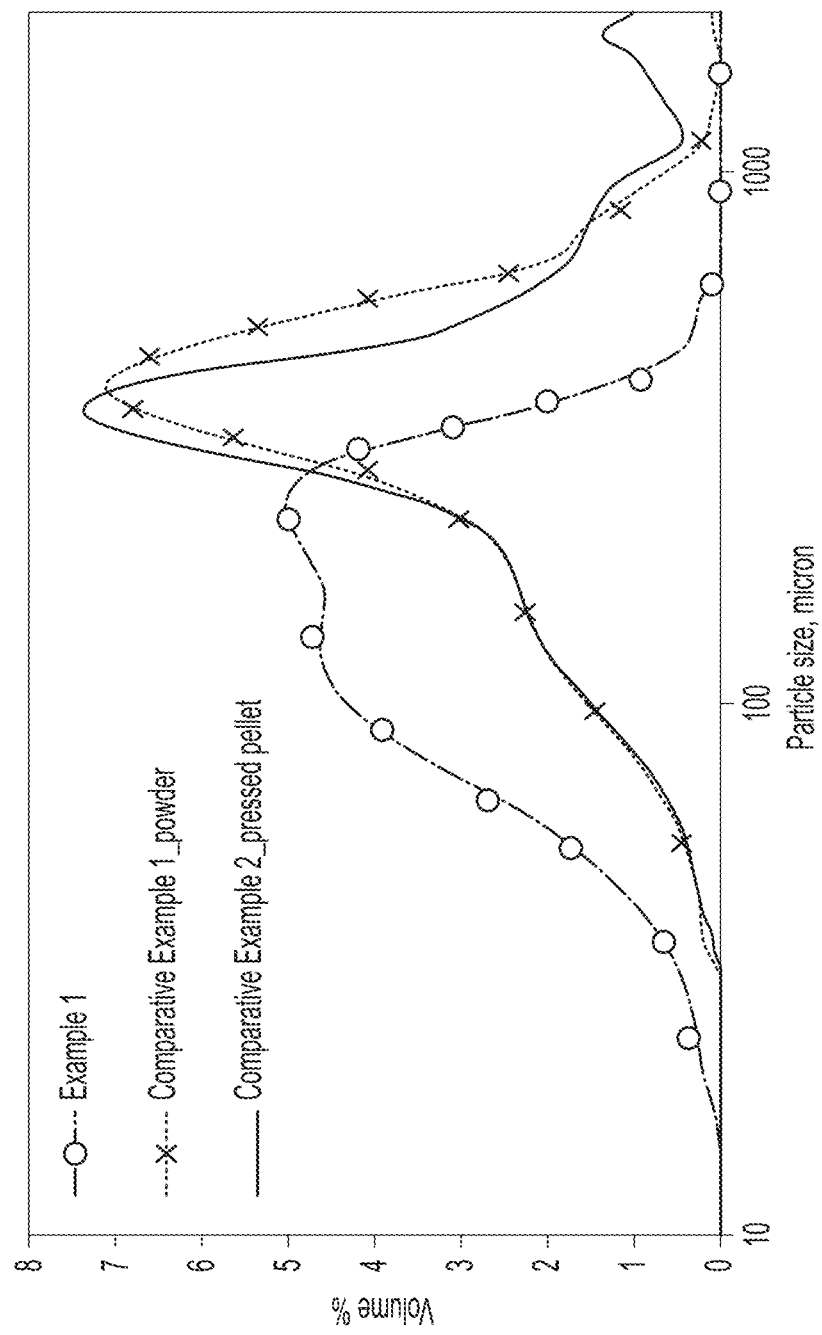
[Fig. 1]

[Fig. 2]
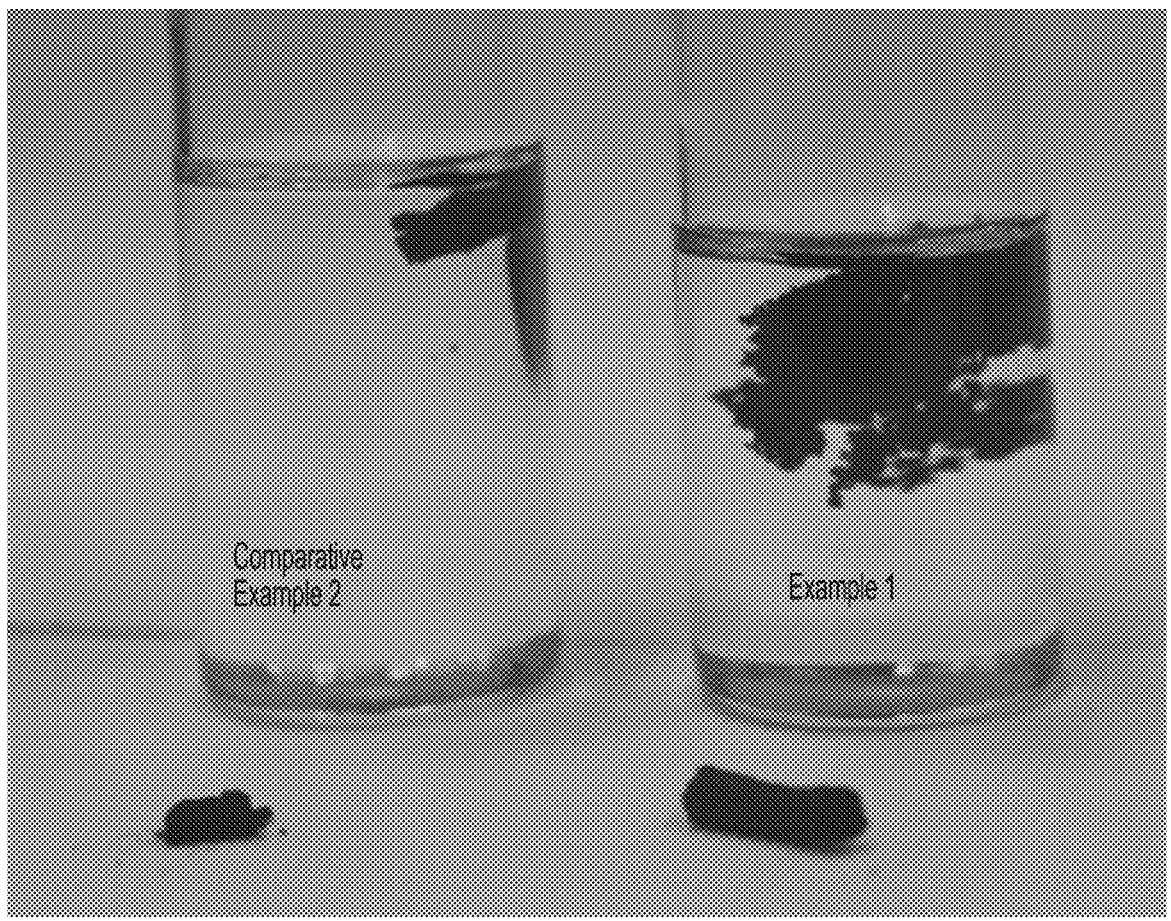

[Fig. 3]
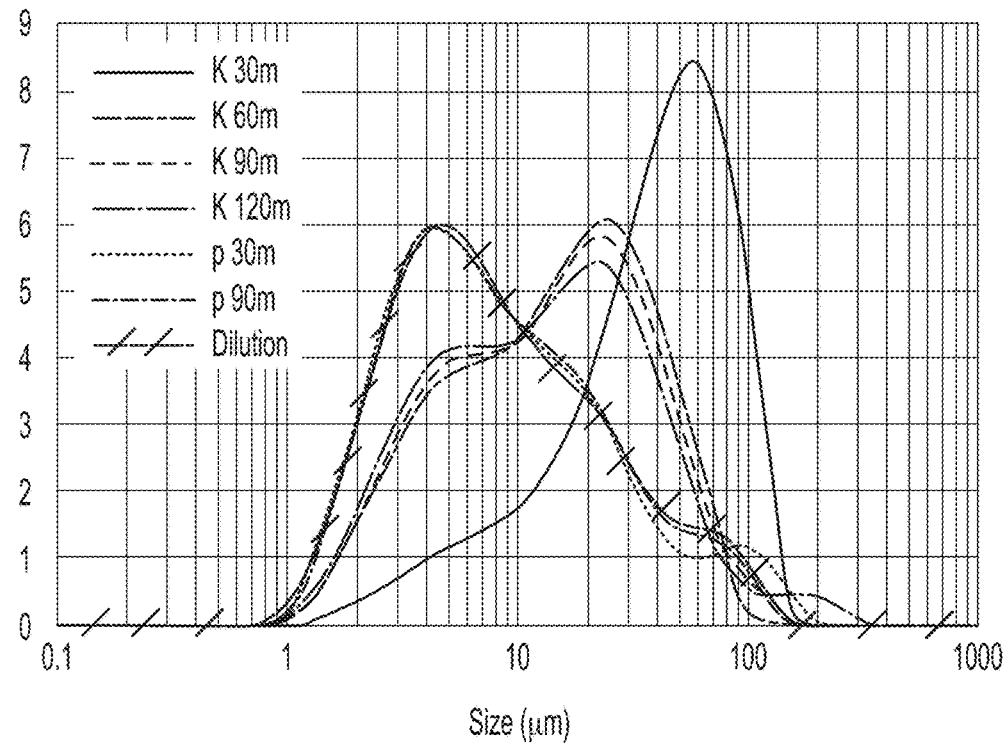
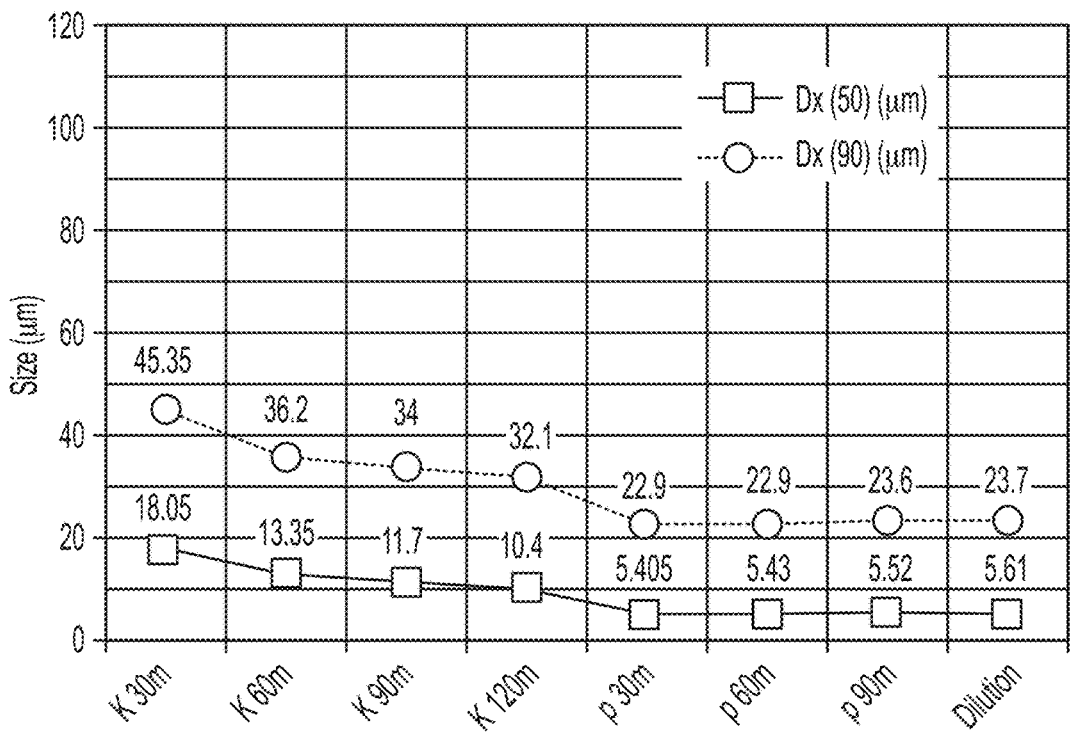

[Fig. 4]
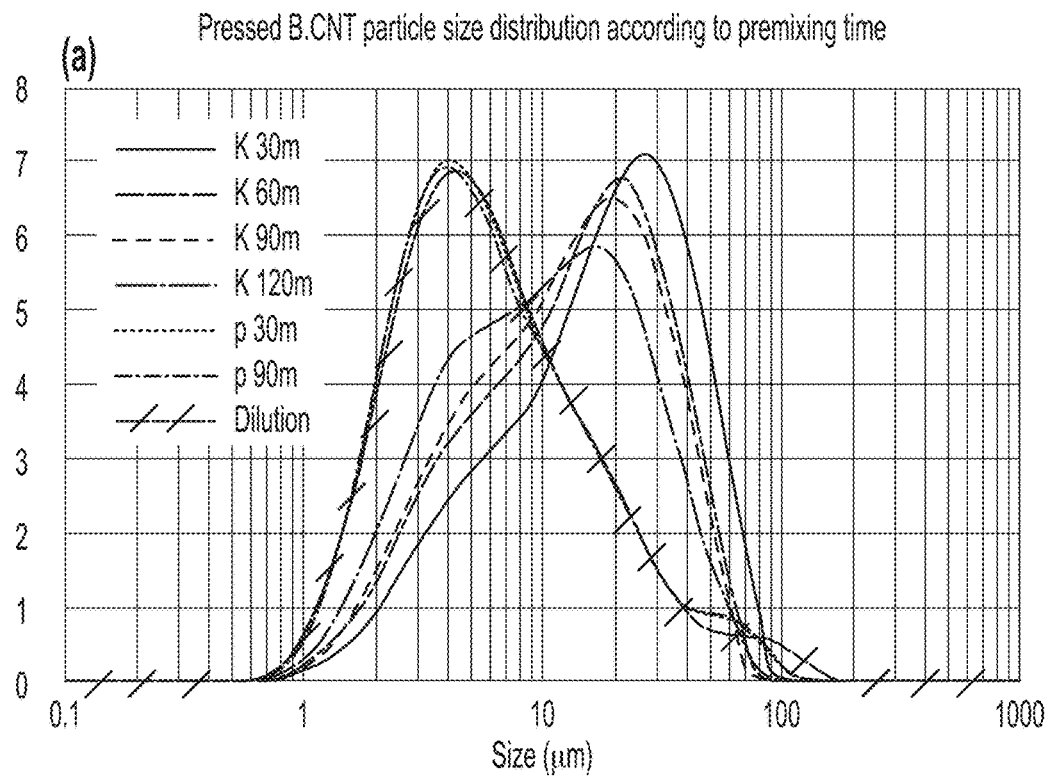
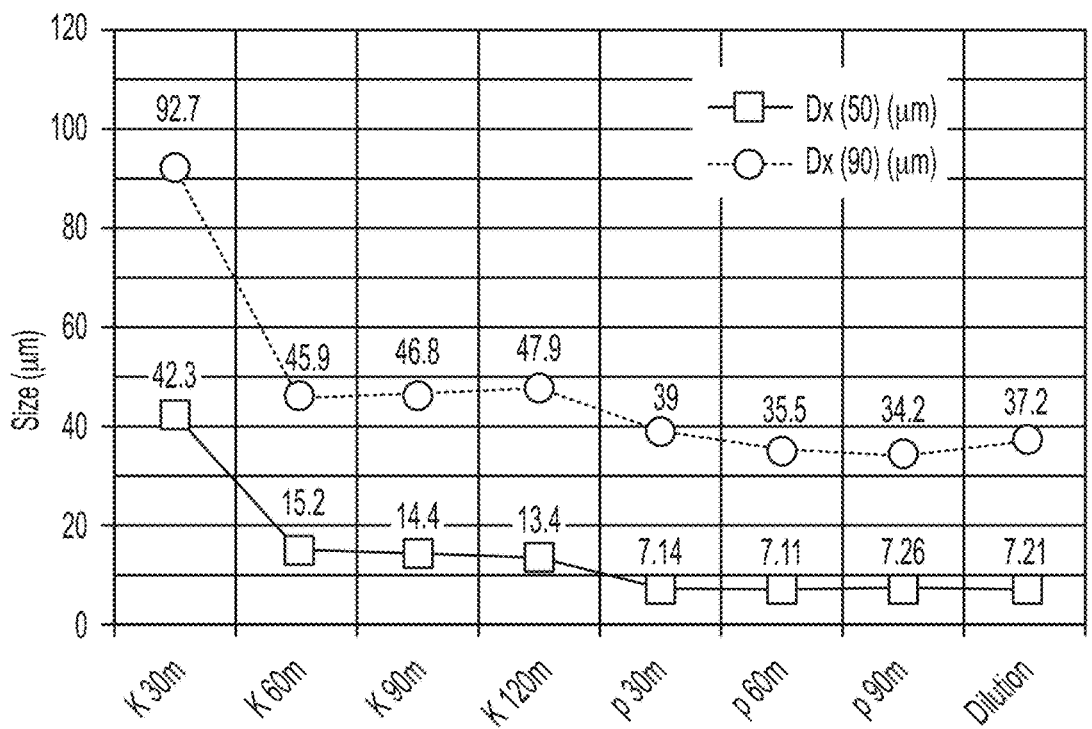

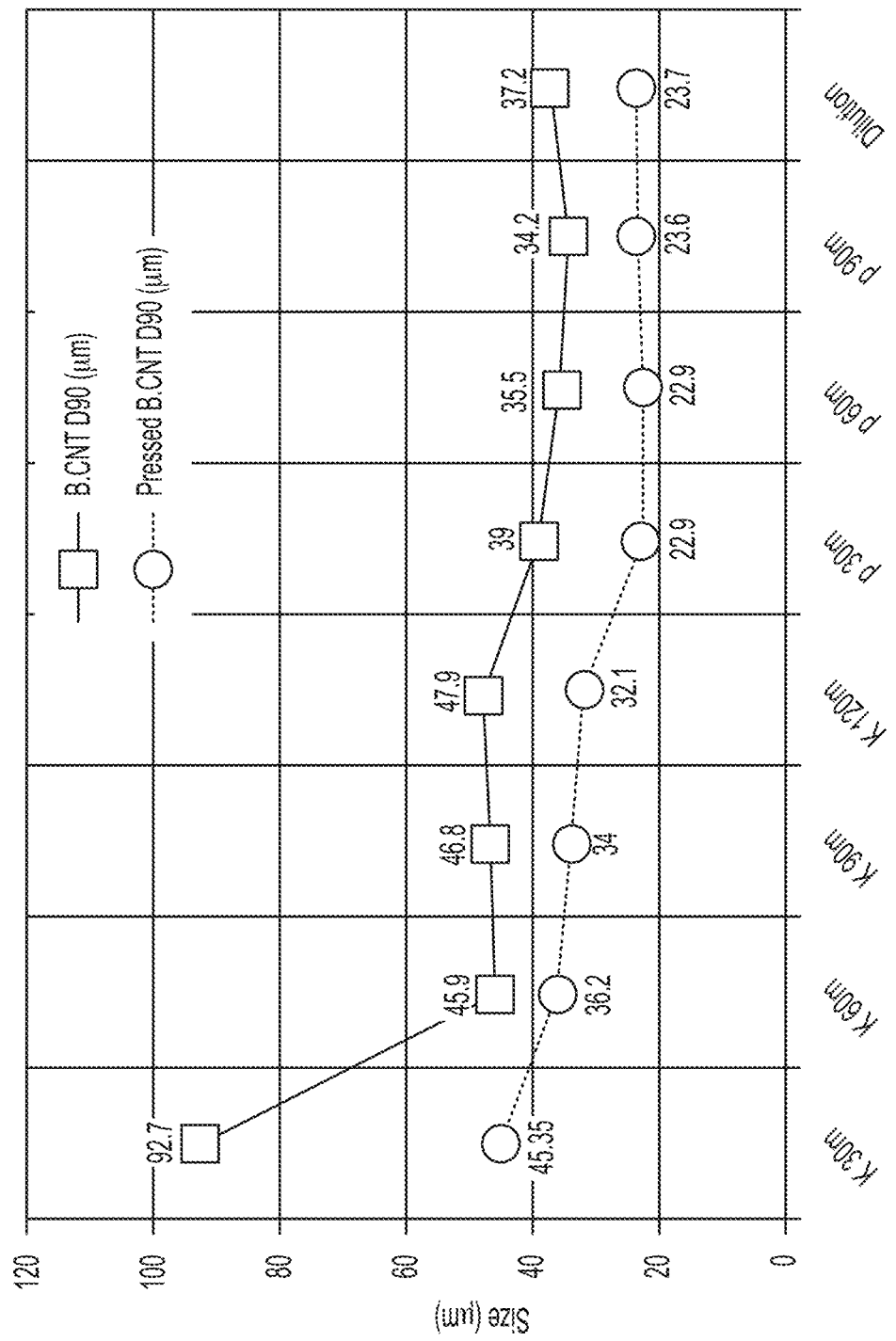

[Fig. 6]
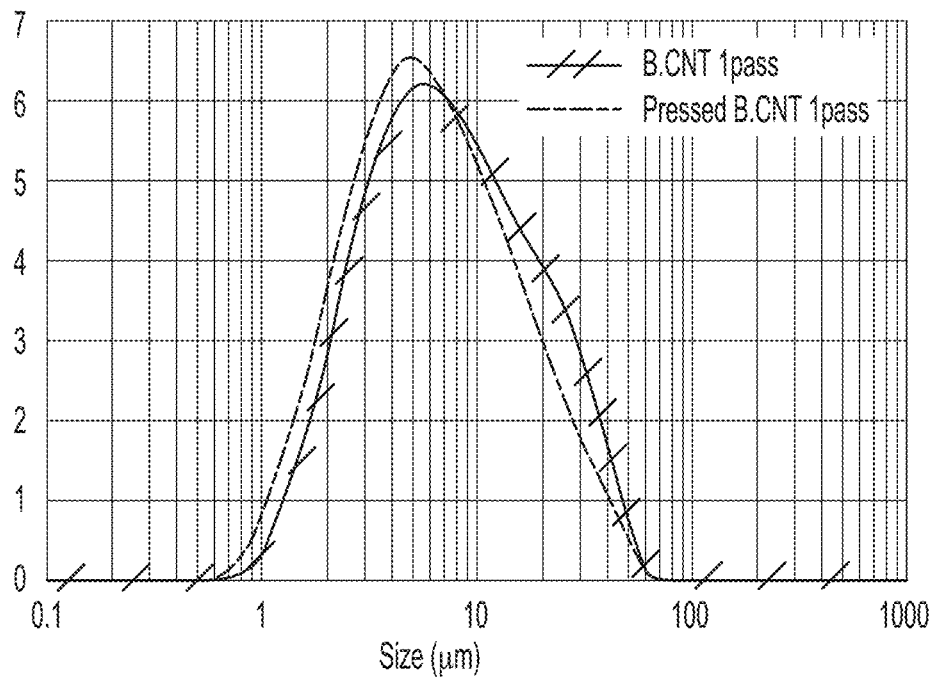
(a) Particle size distribution after S/M 1 pass (0.5 Kg/min)
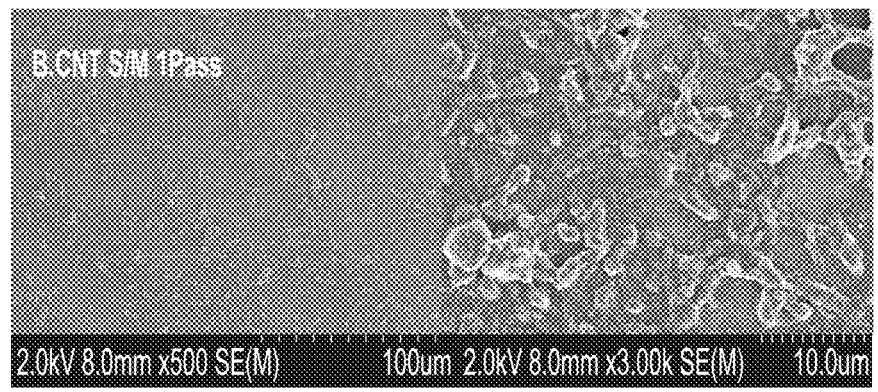
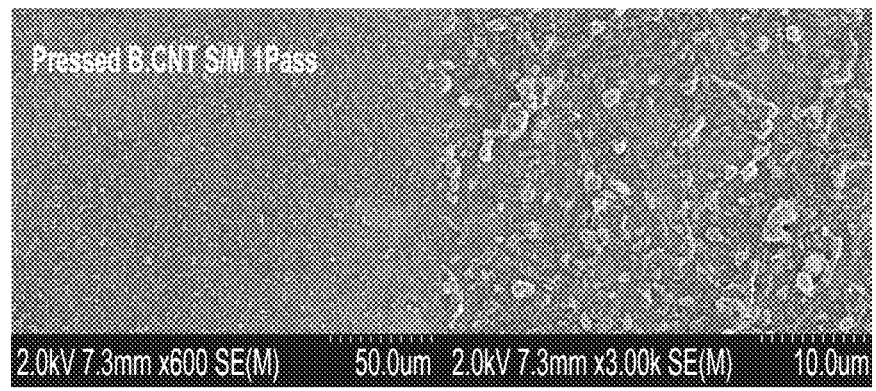

[Fig. 7]
(a)
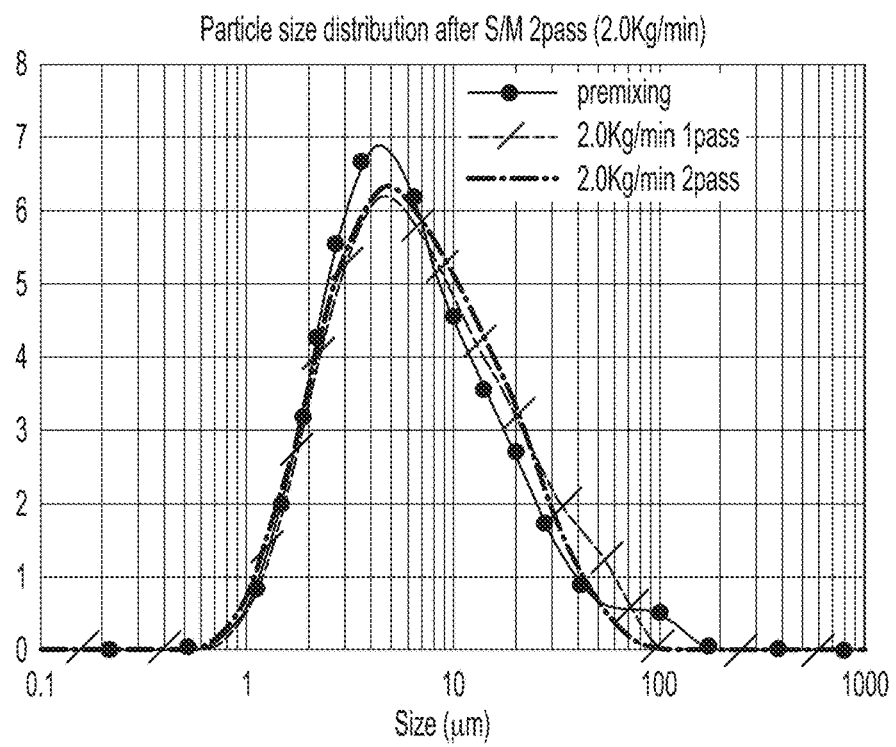
(b)
S/M 1pass( 2.0Kg/min)
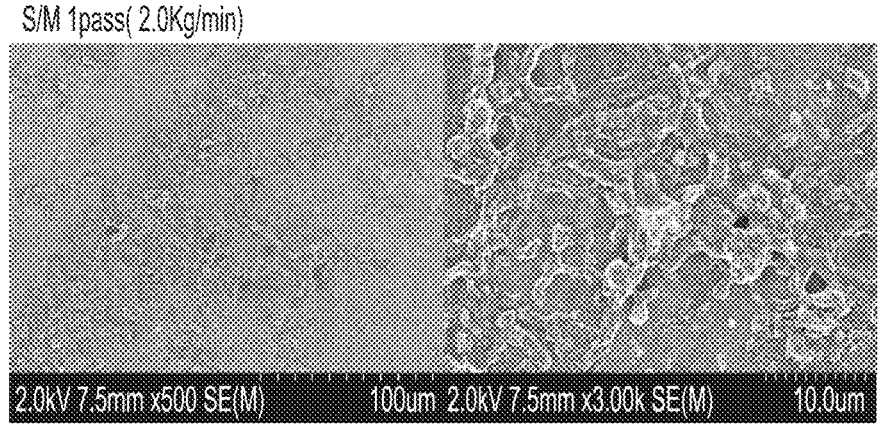
S/M 2pass( 2.0Kg/min)
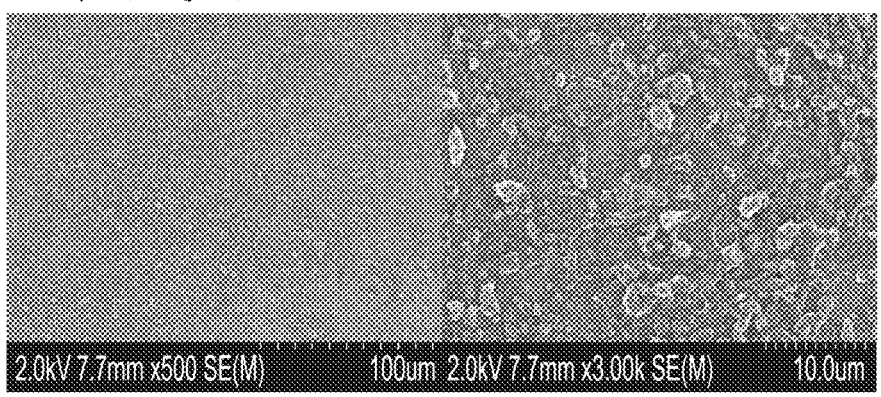

[Fig. 8]
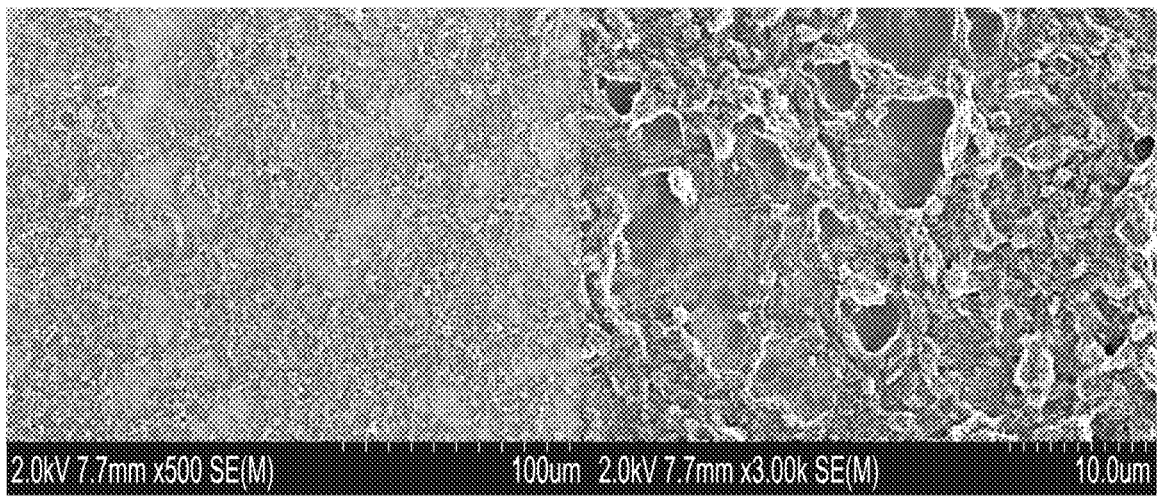
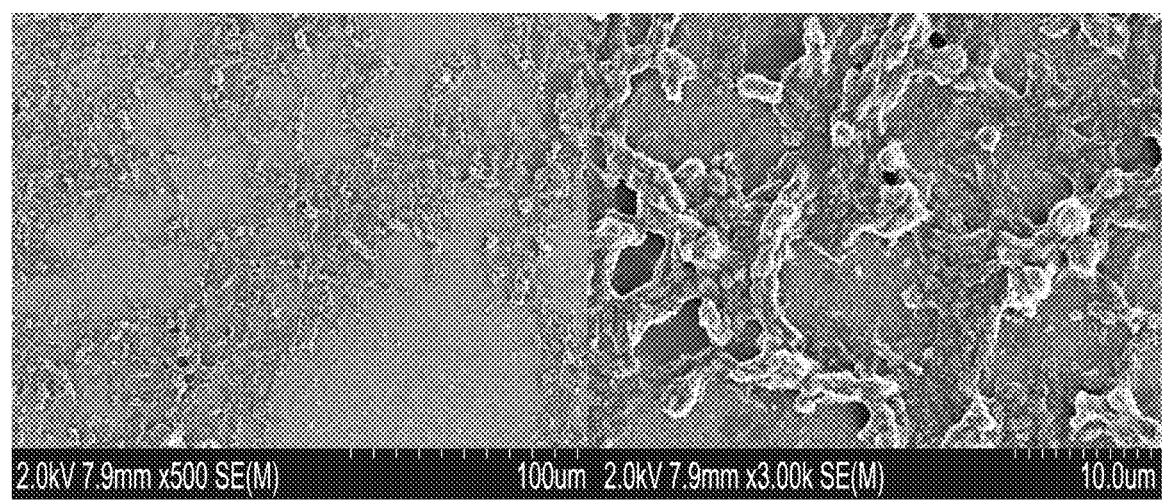

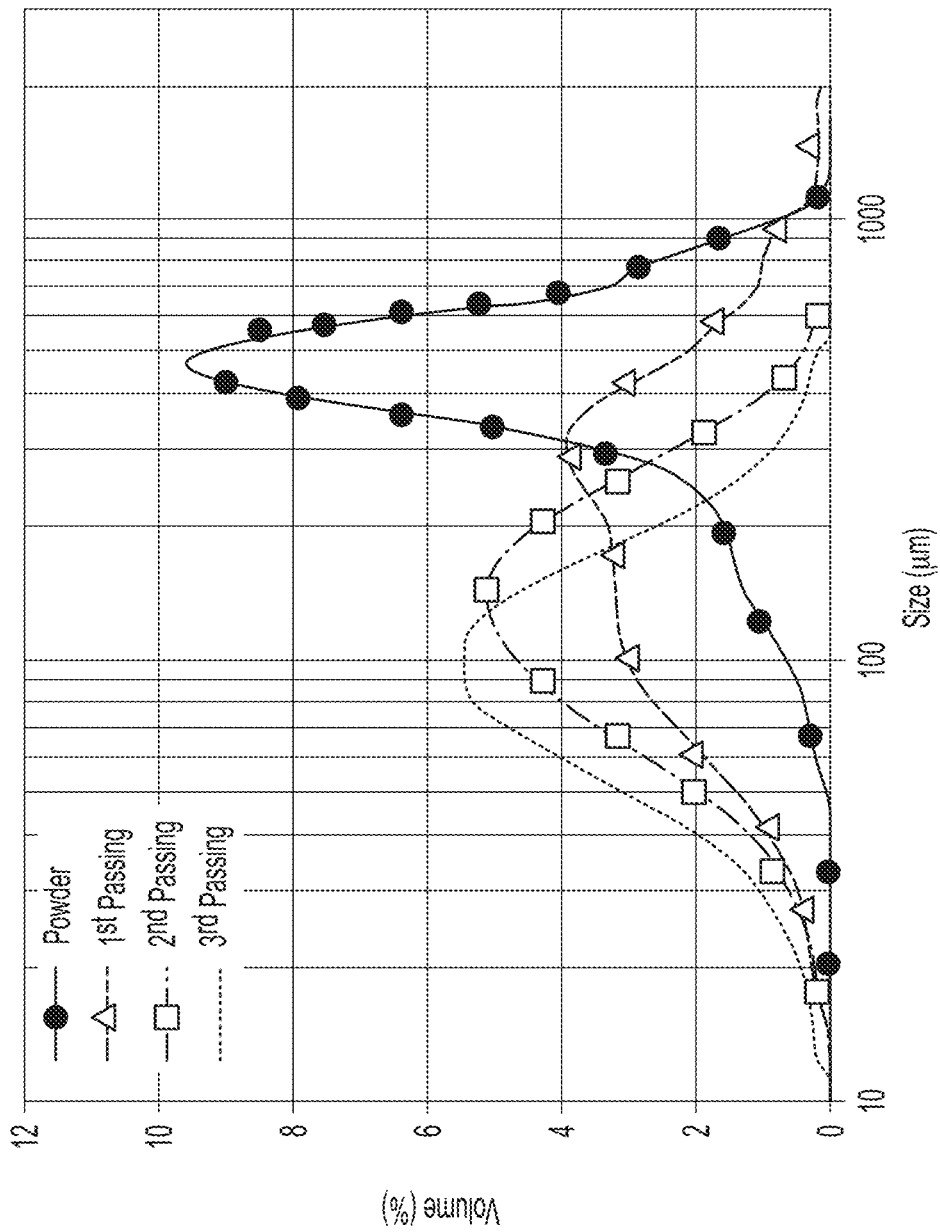

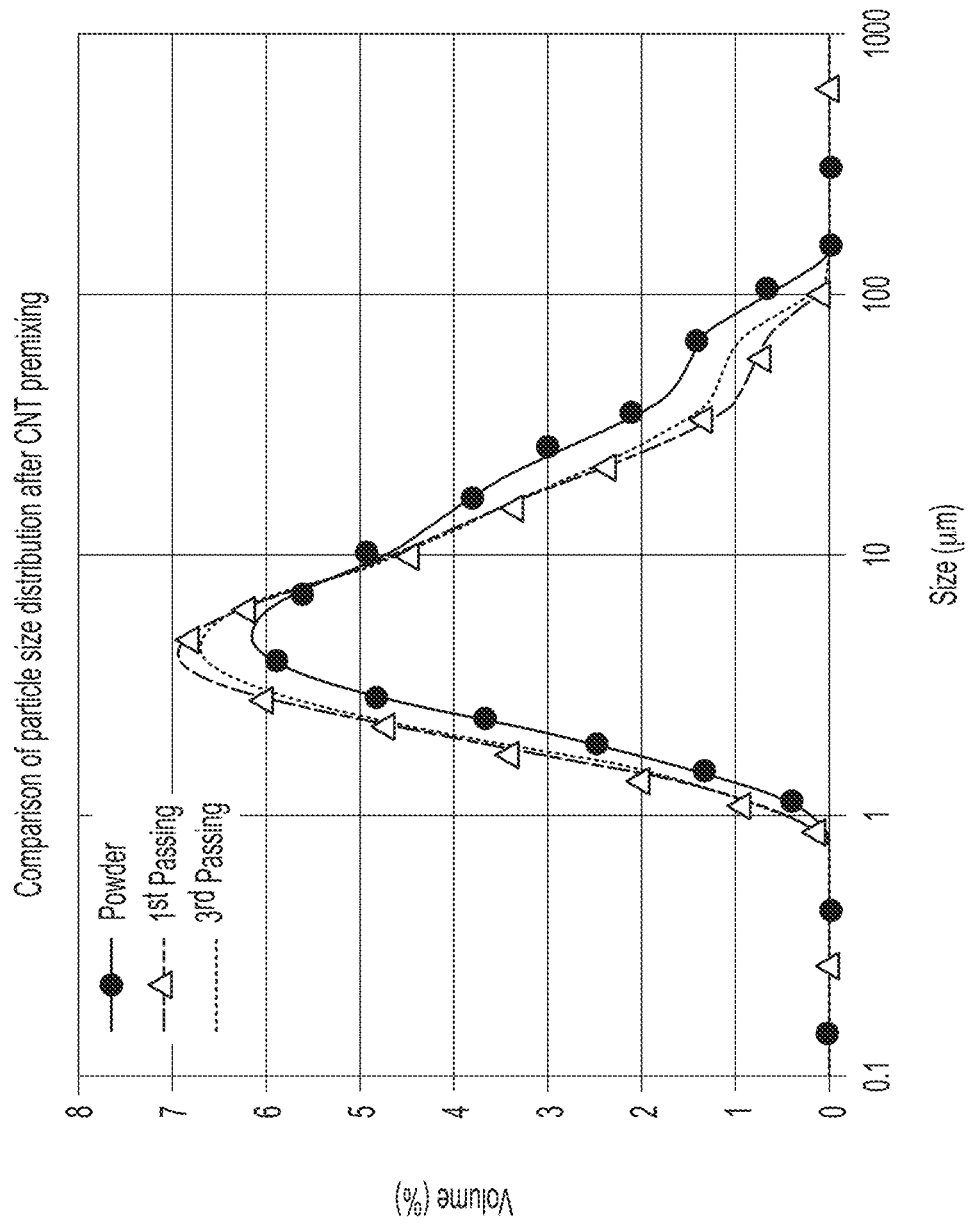
[Fig. 10]

[Fig. 11]
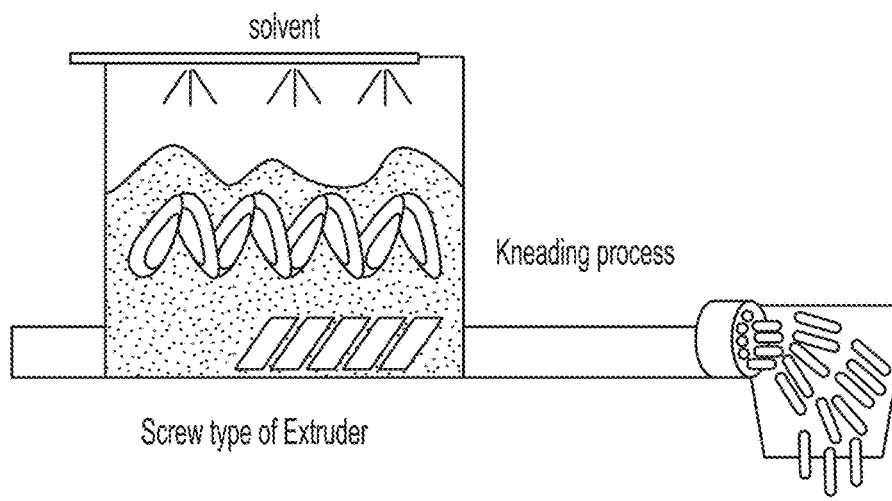
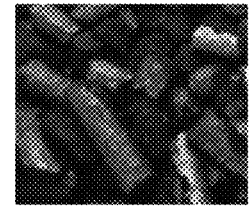
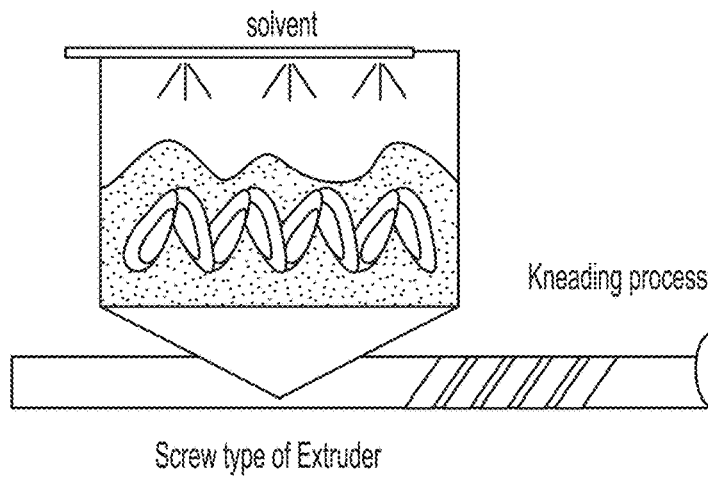

CARBON NANOTUBE PELLETS AND METHOD FOR MANUFACTURING SAME

BACKGROUND OF THE INVENTION

1. Field of the Invention

This application is a National Stage Entry of International Application No. PCT/KR2016/011616 filed on Oct. 17, 2016, and claims the benefit of Korean Application No. 10-2016-0006986, filed on Jan. 20, 2016, all of which are hereby incorporated by reference in their entirety for all purposes as if fully set forth herein.

The present invention relates to carbon nanotube pellets, and more particularly, to a method of pelletizing carbon nanotubes to facilitate handling and processing of the carbon nanotubes.

2. Description of the Related Art

Carbon nanotubes exhibit insulating, conducting or semiconducting properties depending on their inherent chirality. Carbon nanotubes have a structure in which carbon atoms are strongly covalently bonded to each other. Due to this structure, carbon nanotubes have a tensile strength approximately 100 times greater than that of steel, are highly flexible and elastic, and are chemically stable. Carbon nanotubes are of industrial importance in the manufacture of composites because of their size and specific physical properties. Carbon nanotubes can find widespread applications in numerous fields, including electronic materials and energy materials. For example, carbon nanotubes are applicable to secondary batteries, fuel cells, electrodes of electrochemical storage devices (e.g., supercapacitors), electromagnetic wave shields, field emission displays, and gas sensors.

However, due to the low density of the bulk carbon nanotubes and scattering in the process due to the powder form of tens of micrometers of the carbon nanotubes, it may cause harm to the human body and malfunction of the electric appliance. In addition, there is a difficulty in dispersion due to a difference in apparent bulk density between pellets and powder-type polymers to be mixed.

For the above reasons, conventionally, the carbon nanotubes are usually provided by pelletization because of the increase in the density of the carbon nanotubes and the ease of handling and transportation thereof. In addition, the pelletized carbon nanotubes are convenient for use in various processing apparatuses. In the conventional method, in order to granulate or pelletize the carbon nanotubes, two different methods, that is, a method in which they are wet pelletized and then dried and a method in which they are dry pelletized are used.

Generally, dry pelletization uses a pelletizing drum comprising a horizontally disposed rotary tube, the interior of which is referred to as a pelletizing chamber. In order to granulate the carbon nanotube powder, it is produced by process in which the industrial powders are preliminarily densified and rolling from a rotating tube wall in a pelletizing drum to pelletize them. They are agglomerated by electrostatic forces and Van-Der-Waals forces that enable dry pelletization and are usually produced by applying a few tons of pressure during dry pellet formation. Therefore, there is a problem that the pellets can be destroyed again during the manufacturing process. The wet pelletization process is mainly performed by a liquid bridge and a capillary force between the carbon nanotubes. Conventionally, when mixing with carbon nanotubes by a wet pelletization method, excessive water is added because the distribution of water and binder is poor. In this case, the added water is usually removed by heat in a rotary drum dryer. Excessive water therefore increases the load on the dryer and, consequently, reduces the throughput of the product through the process. Excessive water also increases the energy and time required for drying. Therefore, uniform distribution of water and binder in the carbon nanotube mixture is very important in the pelletization process. Furthermore, if the components of the pellets are not mixed uniformly, the quality of the produced carbon nanotube pellets may not be constant.

To solve this problem, a method of treating a dispersant such as a surfactant in order to improve the dispersibility of pellets has been studied. However, there is still a problem that such a material may act as an impurity by remaining in the carbon nanotube pellets.

SUMMARY OF THE INVENTION

An object of the present invention is to provide a method for producing carbon nanotube pellets having improved dispersibility.

Another object of the present invention is to provide carbon nanotube pellets prepared by the above method.

In order to solve the problems of the present invention, there is provided a method for producing carbon nanotube pellets comprising the steps of:

mixing carbon nanotubes and a solvent at a weight ratio of 5:1 to 1:2 to prepare a carbon nanotube paste; and extruding the carbon nanotube paste into pellets, wherein the extrusion is repeated twice or more, and the particle size of the carbon nanotubes contained in the pellet is decreased in proportion to the number of times of extrusion.

In order to solve other problems of the present invention, there is provided carbon nanotube pellets produced by the above method.

The carbon nanotube pellets produced by the method for producing carbon nanotube pellets according to the present invention can improve the problems of scattering of powders. Also, although the carbon nanotubes in the form of pellets have a high compression ratio over the apparent density of the initial carbon nanotubes, the dispersibility to the solvent is excellent so that the productivity can be improved in the production of the carbon nanotube composite material.

BRIEF DESCRIPTION OF THE DRAWINGS

FIG. 1 shows a particle size distribution of carbon nanotube powders and a particle size distribution of pelletized carbon nanotubes in Examples and Comparative Examples.

FIG. 2 shows dispersion characteristics to the solvent of the pellets prepared in Examples and Comparative Examples.

FIG. 3 is a graph showing (a) a particle size distribution and (b) a particle size change over time in the premixing process using CNTs.

FIG. 4 is a graph showing (a) a particle size distribution and (b) a particle size change over time in the premixing process using CNT pellets.

FIG. 5 shows a change in particle size in a premixing process using CNTs and CNT pellets.

FIG. 6 shows (a) a particle size distribution and (b) a shape of distribution of carbon nanotubes after pastes of premixed CNTs and CNT pellets are discharged from a screw mixer.

FIG. 7 shows (a) a particle size distribution and (b) a shape of distribution according to the discharging rate increase and the number of repetitions of screw mixing process.

FIG. 8 shows particle sizes and shapes of distributions of (a) CNTs and (b) CNT pellets after premixing process.

FIG. 9 shows an initial particle size distribution of CNTs without the premixing process according to the number of times of passing CNT pellets through an extruder.

FIG. 10 shows a particle size distribution of CNTs after the premixing process according to the number of times of passing CNT pellets through an extruder.

FIG. 11 shows a possible embodiment of the apparatus for manufacturing carbon nanotube pellets according to the present invention ((a) an integrated type, (b) an independent type).

DETAILED DESCRIPTION OF THE INVENTION

It should be understood that the terms and words used in the specification and claims are not to be construed as having common and dictionary meanings, but are construed as having meanings and concepts corresponding to the spirit of the invention in view of the principle that the inventor can define properly the concept of the terms and words in order to describe his/her invention with the best method.

The present invention will now be described in detail.

The present invention provides a method for producing carbon nanotube pellets, in which only a small amount of solvent is used to provide carbon nanotube pellets. The method for producing carbon nanotube pellets according to the present invention comprises the steps of:

mixing carbon nanotubes and a solvent at a weight ratio of 5:1 to 1:2 to prepare a carbon nanotube paste; and extruding the carbon nanotube paste into pellets, wherein the extrusion is repeated twice or more, and the particle size of the carbon nanotubes contained in the pellet is decreased in proportion to the number of times of extrusion.

The solvent to be added to the mixing step may be initially added or may be added in portions according to the process steps. Alternatively, the carbon nanotubes may be dispersed in a large amount of the solvent compared to said content of the solvent in the mixing process and then only the solvent is extracted so that they may be mixed at a high concentration. In this case, the content of the solvent may be the amount of the finally remaining solvent.

The apparent density of the carbon nanotube pellets according to the present invention is remarkably increased compared to the apparent density of the carbon nanotubes in the powder form. The apparent density may be 90 kg/m$^3$ or more, preferably 100 kg/m$^3$ or more, and more preferably 120 kg/m$^3$ or more. The apparent density may be 250 kg/m$^3$ or less, or 230 kg/m$^3$ or less, or 200 kg/m$^3$ or less.

The present invention can provide carbon nanotube pellets containing the carbon nanotubes which are extruded from the carbon nanotube paste having a high concentration and compressed. The compression ratio of the pellets may be defined by the following Expression 1.

CNT compression ratio (%)=[apparent density of CNT pellet after compression]/[apparent density of CNT before compression]   [Expression 1]

According to one embodiment, the diameter of the carbon nanotube pellets may be 1 mm or more, or 3 mm or more, preferably 4 mm or more, and more preferably 5 mm or more and may be 20 mm or less, preferably 15 mm or less, and more preferably 10 mm or less. The length of the carbon nanotube pellets may be 10 mm or more, preferably 20 mm or more, more preferably 30 mm or more, or 50 mm or more.

Further, the pellets may have a length of 200 mm or less, preferably 180 mm or less, and more preferably 150 mm or less.

The pellets can be manufactured in a wide of variety of shapes, including, but not limited to, chips, pellets, tablets pills, beads, necklaces, etc.

In addition, the carbon nanotubes contained in the carbon nanotube pellets of the present invention may have a reduced particle size via the extrusion process and the mixing process, for example may have a reduced particle size to 60% or less, and preferably to 50% or less.

Therefore, the average particle size (D50) of the carbon nanotube particles contained in the carbon nanotube pellets may be about 200 μm or less, or about 150 μm or less. And it is possible to contain carbon nanotubes having the average particle size of about 20 μm or less, and preferably about 15 μm or less depending on the method of the manufacturing process.

The present invention also provides a method for producing carbon nanotube pellet as described above.

According to the method for producing the carbon nanotube pellets according to the present invention, the method comprises the steps of:

mixing carbon nanotubes and a solvent at a weight ratio of 5:1 to 1:2 to prepare a carbon nanotube paste;

extruding the carbon nanotube paste into pellets; and drying the pellets, wherein the extrusion is repeated twice or more.

The carbon nanotube paste may be further mixed in a mixer equipped with a screw mixer after a mixing step with a general type of stirrer and then transferred to an extruder.

For example, the carbon nanotube pellet may be produced by the method comprising the steps of:

premixing carbon nanotubes and a solvent;

stirring and mixing the premixed solution of carbon nanotubes in a screw mixer; and transferring the mixed solution of carbon nanotubes from the screw mixer to an extruder and extruding the mixture into pellets.

According to one embodiment, the mixing in the screw mixer may proceed at a higher concentration than in the premixing step, and thus the viscosity of the mixed solution of carbon nanotubes may be increased as compared with the premixed solution.

According to one embodiment, the premixing may be performed by adding a solvent at a time, or by adding a solvent in several steps. For example, it comprises the steps of:

mixing a small amount of solvent h carbon nanotubes to prepare a first paste (Kneading);

adding additional predetermined solvent to the first paste and kneading it to prepare a second paste (Paste); and adding a solvent to the second paste to prepare a premixed solution (Dilution).

The content of carbon nanotubes in the premixed solution may be 2 to 15% by weight, preferably 2 to 10% by weight, and more preferably 5% by weight based on the total weight of the whole mixed solution. The method may further comprise the step of increasing the concentration of the mixed solution by partially removing the solvent involved before mixing in the screw mixer. Alternatively, the concentration may be increased by removing the solvent as the temperature is raised by a screw mixing step. The mixed solution of carbon nanotubes which is finally mixed in the screw mixer may contain the carbon nanotubes and the solvent in a weight ratio of 5:1 to 1:2.

According to one embodiment, in the premixing process, the stirring time in the first step (kneading) and the second step (paste) may be 2 hours or less, preferably 1 hour or less, respectively. In case of mixing for more than the above stirring time, the aggregation between the particles may become large, and the dispersion characteristics may be rather deteriorated.

Finally, the stirring time for the low-concentration carbon nanotubes may be 30 minutes or more, preferably 60 minutes or more, and more preferably 100 minutes or more, and the total time of each step of the premixing process may be 300 minutes or less and preferably 240 minutes or less.

The viscosity of the premixed solution of carbon nanotubes prepared in the premixing step may be 4,000 cps to 10,000 cps, preferably 5,000 cps to 10,000 cps.

The premixed solution may be added to a screw mixer to be further mixed. In this process, the concentration of the carbon nanotubes may be increased, or the premixed solution may be supplied to the screw mixer after removing some of the solvent. It may be supplied to the extruder after further mixing in the screw mixer for at least about 5 minutes, preferably at least 10 minutes, more preferably at least 20 minutes.

At this time, the discharging amount of the mixed solution from the screw mixer can be adjusted to 0.3 kg/min or more, preferably 0.5 kg/min or more, and can be adjusted to about 5 kg/min or less, preferably 3 kg/min or less, and more preferably 2.5 kg/min or less. Depending on the discharging rate, the particle size and the degree of dispersion of the carbon nanotubes contained in the mixed solution may vary, and the viscosity of the mixed solution may also increase.

The viscosity of the mixed solution of carbon nanotubes discharged from the screw mixer may be about 9,000 to 30,000 cps.

According to one embodiment, the carbon nanotube pellets produced through the extrusion step can be re-dispersed and mixed in a solvent and re-extruded to produce pellets. In the process of re-dispersing the compressed pellets as described above, the particle size and/or viscosity of the carbon nanotubes are reduced, thus the dispersion characteristics in the solvent can be improved and the efficiency of the manufacturing process can be improved.

For example, when the premixed solution is prepared by using the carbon nanotubes, the viscosity of the premixed solution can be reduced to 4,000 cps or less, and the viscosity of the carbon nanotubes discharged after mixing in the screw mixer is lowered to 10,000 cps or less.

In addition, in the manufacturing process for producing carbon nanotube pellets by re-dispersing the carbon nanotube pellets, the size of the carbon nanotubes may vary depending on the number of times of repeating the extrusion. For example, the particle size of D90 of the particles of carbon nanotubes may satisfy the following Expression 2:

$$-167.3x+650 \leq y \leq -167.3x+670$$ [Expression 2]

wherein x is the number of times of extrusion of the carbon nanotubes, and y is the particle size of D90 (μm) of the carbon nanotubes.

The mixed solution of carbon nanotubes will now be described in detail.

According to one embodiment, the dispersion solvent in which the carbon nanotubes are mixed is at least one selected from the group consisting of water, alcohols, Cellosolve, ketones, amides, esters, ethers, aromatic hydrocarbons such as benzene or toluene, and aliphatic hydrocarbons such as hexane or heptane, and preferably at least one selected from the group consisting of water, alcohols, amides, esters, and ketones.

For example, any one selected from the group consisting of water, methanol, ethanol, propanol, acetone, dimethylformamide (DMF), dimethylacetamide, dimethyl sulfoxide (DMSO), and N-methylpyrrolidone (NMP) or a mixed solvent of two or more of them may be used.

The carbon nanotubes according to the present invention may be prepared by chemical vapor deposition (CVD) through decomposition of a carbon source by using a supported catalyst. The use of the supported catalyst allows for growth of the starting carbon nanotubes. The catalytic metal of the supported catalyst is not especially limited so long as it promotes the growth of carbon nanotubes.

Examples of such catalytic metals include metals of Groups 3 to 12 in the 18-group type Periodic Table of the elements recommended by IUPAC in 1990. The catalytic metal is preferably selected from the group consisting of the metals of Groups 3, 5, 6, 8, 9, and 10. Particularly preferred is at least one metal selected from iron (Fe), nickel (Ni), cobalt (Co), chromium (Cr), molybdenum (Mo), tungsten (W), vanadium (V), titanium (Ti), ruthenium (Ru), rhodium (Rh), palladium (Pd), platinum (Pt), and rare earth elements. A precursor of the catalytic metal may also be used. The catalytic metal precursor is not particularly limited so long as it contains the catalytic metal. For example, the catalytic metal precursor may be an inorganic salt (e.g., a nitrate, sulfate or carbonate) of the catalytic metal, an organic salt (e.g., an acetate) of the catalytic metal, an organic complex (e.g., an acetylacetone complex) of the catalytic metal, and an organometallic compound of the catalytic metal.

It is widely known that a reaction activity is controlled by using a combination of two or more catalytic metals and catalytic metal precursor compounds, for example, a combination of at least one element selected from iron (Fe), cobalt (Co), and nickel (Ni), at least one element selected from titanium (Ti), vanadium (V), and chromium (Cr), and at least one element selected from molybdenum (Mo) and tungsten (W). Preferably, the metal catalyst includes cobalt (Co) as a major component and optionally one or more metals selected from iron (Fe), molybdenum (Mo), chromium (Cr), and vanadium (V).

Specifically, the catalyst used in the preparation of the starting carbon nanotubes may be prepared by dissolving $Co(NO_3)_2 \cdot 6H_2O$, $(NH_4)_6Mo_7O_{24} \cdot 4H_2O$, $Fe(NO_3)_2 \cdot 6H_2O$ or $Ni(NO_3)_2 \cdot 6H_2O$ as a catalytically active metal precursor in distilled water and wet impregnating the solution into a support, such as $Al_2O_3$, $SiO_2$ or MgO.

Specifically, the catalyst may be prepared by sonicating a catalytically active metal precursor and a support, such as $Al(OH)_3$, $Mg(NO_3)_2$ or colloidal silica.

Alternatively, the catalyst may be prepared by a sol-gel process. In this case, a chelating agent, such as citric acid or tartaric acid, is used to sufficiently dissolve a catalytically active metal precursor in water. Alternatively, the catalyst may be prepared by co-precipitation of readily water-soluble catalytically active metal precursors.

The starting carbon nanotubes used in the method of the present invention may be prepared by bringing the supported catalyst into contact with a carbon-containing compound in a heating zone.

The use of the supported catalyst prepared by an impregnation method is preferred for the following reasons: the supported catalyst has a higher inherent bulk density than co-precipitated catalysts; unlike co-precipitated catalysts, the supported catalyst produces a small amount of a fine powder with a size of 10 microns or less, which reduces the possibility of occurrence of a fine powder due to attrition during fluidization; and high mechanical strength of the supported catalyst effectively stabilizes the operation of a reactor.

The catalyst may use at least one aluminum-based support selected from the group consisting of $Al_2O_3$, $AlO(OH)$, $Al(OH)_3$, and mixtures thereof. The aluminum-based support is preferably alumina ($Al_2O_3$). The aluminum (Al)-based support may further include at least one oxide selected from the group consisting of $ZrO_2$, $MgO$, and $SiO_2$. The aluminum (Al)-based support has a spherical or potato-like shape. The material for the aluminum (Al)-based support has a structure suitable to provide a relatively high surface area per unit weight or volume, such as a porous structure, a molecular sieve structure or a honeycomb structure.

One embodiment of the present invention provides a method for preparing a supported catalyst for CNT synthesis, including (1) mixing a support with an aqueous metal solution including a catalytic component precursor and an active component precursor to prepare an aqueous solution containing the supported catalyst precursors, (2) aging the aqueous solution containing the supported catalyst precursors and impregnating the catalytic component precursor and the active component precursor into the support to obtain a mixture, (3) drying the mixture under vacuum to coat the catalytic component and the active component on the surface of the support, and (4) calcining the vacuum-coated product.

The use of the supported catalyst allows for the growth of carbon nanotubes by chemical vapor deposition through decomposition of a carbon source, leading to the production of the carbon nanotubes.

Specifically, the chemical vapor deposition may be performed by feeding the catalyst for carbon nanotube production into a fluidized bed reactor and introducing at least one carbon source selected from $C_1$-$C_4$ saturated or unsaturated hydrocarbons, and optionally together with a mixed gas hydrogen and nitrogen, into the reactor at 500 to 900° C. Carbon nanotubes are allowed to grow for 30 minutes to 8 hours after the carbon source is introduced into the catalyst for carbon nanotube production.

The carbon source may be a $C_1$-$C_4$ saturated or unsaturated hydrocarbon. Examples of such hydrocarbons include, but are not limited to, ethylene ($C_2H_4$), acetylene ($C_2H_2$), methane ($CH_4$), and propane ($C_3H_8$). The mixed gas of hydrogen and nitrogen transports the carbon source, prevents carbon nanotubes from burning at high temperature, and assists in the decomposition of the carbon source.

The use of the supported catalyst enables the preparation of carbon nanotubes in the form of a spherical or potato-like aggregate having a particle size distribution ($D_{cnt}$) of 0.5 to 1.0. For example, in the case where the catalyst is prepared by impregnating a catalyst component and an active component into a spherical or potato-like granular support, followed by calcination, the catalyst has a spherical or potato-like shape that is not substantially different from that of the support and a carbon nanotube aggregate grown on the catalyst also has a spherical or potato-like shape that is substantially the same as that of the support except for an increase in diameter. Herein, the spherical or potato-like shape refers to a three-dimensional shape having an aspect ratio of 1.2 or less, such as a sphere or ellipse.

The particle size distribution ($D_{cnt}$) of carbon nanotubes is defined by Expression 3:

$$D_{cnt} = [Dn_{90} - Dn_{10}]/Dn_{50} \quad \text{[Expression 3]}$$

where $Dn_{90}$, $Dn_{10}$, and $Dn_{50}$ are the number average particle diameters of the CNTs after standing in distilled water for 3 hours, as measured under 90%, 10%, and 50% in the absorption mode by using a particle size analyzer (Microtrac), respectively.

The carbon nanotubes have a particle size distribution ($D_{cnt}$) of 0.55 to 0.95, more preferably 0.55 to 0.9.

The carbon nanotubes may be of a bundle type or non-bundle type having an aspect ratio of 0.9 to 1. Unless otherwise mentioned, the term "bundle type" used herein refers to a type of carbon nanotubes in which the carbon nanotubes are arranged in parallel or get entangled to form bundles or ropes, and the term "non-bundle or entangled type" describes a type of carbon nanotubes that does not have a specific shape such as a bundle- or rope-like shape. The CNT bundles may have a diameter of 1 to 50 μm.

The aspect ratio is defined by Expression 4:

$$\text{Aspect ratio} = \text{the shortest diameter passing through the center of CNT/the longest diameter passing through the center of CNT} \quad \text{[Expression 4]}$$

The carbon nanotubes have a bulk density of 80 to 250 $kg/m^3$.

Specifically, the bulk density is defined by Expression 5:

$$\text{Bulk density} = CNT \text{ weight (kg)}/CNT \text{ volume (m}^3\text{)} \quad \text{[Expression 5]}$$

The present invention is characterized in that the density distribution of the carbon nanotubes is in a specific range.

The carbon nanotubes may have an average particle diameter of 100 to 800 μm and a strand diameter of 10 to 50 nm.

The metal component remains in the form of a fine powder or impurity in the carbon nanotubes with the above properties. The metal component reacts with a chlorine compound in a high-temperature atmosphere to form a metal chloride having a lower boiling point than the metal component. The metal chloride is removed by evaporation at a temperature equal to or higher than the boiling point of the metal chloride. The purified carbon nanotubes have improved physical properties, particularly improved thermal stability. Due to their improved physical properties, the purified carbon nanotubes are suitable for use in flame retardant materials and metal composites exposed to high temperature environments.

The present invention uses a method of removing residual metal generated from a metal catalyst used in a manufacturing process of carbon nanotubes by chlorination of the residual metal by reacting with a chlorine-containing compound at a high temperature. By purifying the carbon nanotubes by using such a method, deterioration of physical properties due to metal impurities such as residual metals can be improved.

The purification process of the carbon nanotubes will be described in more detail.

The purification process of the carbon nanotubes comprises the steps of:

chlorinating a residual metal by reacting the metal remaining in the produced carbon nanotubes with a chlorine-containing compound at a first temperature in a vacuum or inert gas atmosphere; and evaporating and removing the chlorinated residual metal at a second temperature higher than the first temperature.

According to one embodiment, the chlorine-containing compound may be chlorine ($Cl_2$) or trichloromethane ($CHCl_3$) gas. Since the chlorine-containing compound is low in reactivity with the carbon nanotubes, the damage to the produced carbon nanotubes can be further reduced.

After the chlorination step, the evaporation and removal of the chlorinated metal at the second temperature may be carried out in an inert gas or a vacuum atmosphere for 30 minutes to 300 minutes. This should be the range which only chlorinated residual metals can be removed without affecting the carbon nanotubes. Further, the evaporation and removal of the chlorinated metal may proceed while alternately forming a vacuum atmosphere and an inert gas atmosphere, which may further enhance the removal efficiency.

The content of metal impurity in the carbon nanotubes from which the residual metal has been removed by the above method may be 50 ppm or less. The metal impurities in the carbon nanotubes may be measured by ICP analysis. According to one embodiment, the carbon nanotube may be a metal catalyst containing a metal such as cobalt (Co) or iron (Fe) as a main component. In this case, after the purification, the content of each of main component metal may be 40 ppm or less and the total content may be 50 ppm or less.

The method of purifying carbon nanotubes as described above not only can effectively remove residual metals such as catalytic metals while suppressing damage or cutting of carbon nanotubes or solidification of carbon nanotubes into amorphous carbon material, but also it can suppress the occurrence of physical damage or cutting of carbon nanotubes due to purifying the carbon nanotubes without sonicating. As a result, it is possible to provide carbon nanotubes having improved mechanical properties and physical properties, and in particular, carbon nanotubes having remarkably improved thermal stability.

The present invention also provides an apparatus for manufacturing carbon nanotube pellets.

The apparatus for manufacturing carbon nanotube pellets according to the present invention comprises:

a mixing part having a mixing device for mixing carbon nanotubes and a solvent to prepare a carbon nanotubes paste;

a screw mixer provided at the bottom of the mixing part and for additionally kneading a mixture of the carbon nanotubes and the solvent; and an extruding device for receiving the mixture from the screw mixer and molding the mixture into pellets by compression molding.

The mixing device provided in the mixing part may be a mixing device used in a general apparatus for producing slurry, and may be selected from a mixing apparatus such as an agitation type, a shaking type, or a rotary type. Specifically, there may be mentioned a method by using a dispersion kneader such as a homogenizer, a ball mill, a sand mill, a roll mill, a planetary mixer and a planetary kneader. It may be preferred that the stirring speed in a vertical direction and a horizontal direction can be independently controlled.

According to one embodiment, the screw mixer may include a single screw, a double screw, and multiaxial screw such as a three-axial screw or more.

According to one embodiment, the apparatus has an integrated type (FIG. 11a) in which the screw mixer may be located in the mixing part, or an independent type (FIG. 11b) in which the screw mixer is separated from the mixing part and the mixed solution produced in the mixing part is supplied to the screw mixer. It can be selected depending on the manufacturing method.

For example, in the manufacturing apparatus, the mixing part and the screw mixer are separated from each other and the kneading step by the mixing part and the kneading step by the screw mixer may be independently performed. Specifically, the apparatus may have a separator between the mixing part and the screw mixer. Alternatively the apparatus itself may be divided so that the carbon nanotube mixture is produced in the mixing part, and then the produced mixture may be supplied to the screw mixer. Alternatively, a hopper may be further provided between the mixing part and the screw mixer and a separator may be provided between the hopper and the mixing part, so that there is an independent space in which the mixing part and the hopper are isolated by the separator. In the above-mentioned independent type of manufacturing apparatus, it is possible to carry out a continuous process in which a step in which the carbon nanotube mixture is supplied to the hopper or the screw device, then the mixture supplied from the mixing part is fed into the screw mixer, is kneaded and is transferred to the extruder to produce pellets, and a step in which the carbon nanotube and the solvent are supplied to the mixing part to prepare a mixture, are simultaneously proceeded.

The extruder can be used without limitation as long as it allows to mold slurry or paste. For example, a screw extruder may be used, and the extruder may include a molding part for molding into the pellets having a predetermined length and diameter.

The present invention provides a method for producing a CNT composite material by using the carbon nanotube pellets.

The present invention can improve the problems of the change of the content generated by scattering of powders and safety issues by using carbon nanotubes in the form of pellet rather than carbon nanotubes in the form of powder in composite materials. And since the density of the pellet form is higher than that of the powder form, transport, transfer and improvement become easier. Therefore, it can be more effectively applied to the manufacturing of composite materials.

For example, the composite material, for example the carbon nanotubes may be applied to an electrode of an electrochemical storage device such as a secondary cell, a fuel cell or a super capacitor, an electromagnetic wave shield, a field emission display, or a gas sensor.

The present invention will be explained in more detail with reference to the following examples, including comparative examples. However, these examples are provided for illustrative purposes only and are not intended to limit the scope of the invention.

EXAMPLE 1

Distilled water was added to carbon nanotubes at a weight ratio of 5:1 to 1:2, and was mixed for a predetermined time. The mixture was extruded by a screw extruder to prepare pellets.

COMPARATIVE EXAMPLE 1

The carbon nanotubes used in Example 1 were used in the form of powders.

COMPARATIVE EXAMPLE 2

The carbon nanotubes used in Example 1 were directly pressed at a predetermined pressure to prepare pellets.

EXPERIMENTAL EXAMPLE 1: COMPARISON OF CHARACTERISTICS OF PELLETS

The particle sizes of the carbon nanotubes used in Example 1 and Comparative Example 1 to Comparative Example 2 were measured and described in Table 1 below.

In order to determine the dispersion characteristics according to the method for producing carbon nanotube pellets, the carbon nanotube pellets of Example 1 and Comparative Example 2 were put into an NMP solution and the degree and the time of dispersion were observed.

TABLE 1

|  | Compression method | Shape of sample | D50 | D90 | D99 |
|---|---|---|---|---|---|
| Example 1 | Extruder | Pellet | 140 | 293 | 437 |
| Comparative Example 1 | None | Powder | 325 | 589 | 972 |
| Comparative Example 2 | Press | Pellet | 318 | 779 | 1827 |

Table 1 and FIG. 1 show the particle sizes of the carbon nanotubes of Example 1 and Comparative Examples 1 and 2. According to Table 1 and FIG. 1, for the carbon nanotubes contained in the pellets produced by the dry method in Comparative Example 2, D50 is almost unchanged, but rather D90 increases. It is considered that because the pellets prepared by the dry method have poor dispersion characteristics in the solvent, the possibility of the carbon nanotubes aggregating with each other increases. Therefore, particles larger than the carbon nanotube powder may exist in a range of the large particle size such as D90 as shown in Table 1 and FIG. 1. On the other hand, the particles of the carbon nanotubes dispersed from the pellets of Example 1 were reduced by 50% or more as compared with the powdered carbon nanotubes. In FIG. 1, it can be seen that the particle size is reduced overall.

FIG. 2 shows the results of dispersing the pellets prepared in Example 1 and Comparative Example 2 in a solvent. As shown in FIG. 2, it was found that the pellets of Example 1 were dispersed in the solvent at the same time as introduction of the solvent, but the pellets of Comparative Example 2 produced by dry compression were not dispersed immediately upon introduction of the solvent. It can be seen from the graph of particle size distribution of FIG. 1 that there are some large particles even after dispersion.

EXAMPLE 2

Carbon nanotubes and distilled water were mixed for 2 hours to prepare a first paste (Kneading). Then, distilled water was added to the first paste and mixed them for 1.5 hours to prepare a second paste (Paste). Distilled water was further added to the second paste and the mixture was diluted to some extent (Dilution). Thus, premixing process of the carbon nanotubes was carried out. The viscosity of the premixed carbon nanotube paste was 7,000 cps. Table 2 shows the particle size of the carbon nanotubes according to the steps of the premixing process and the mixing time in each step. FIG. 3 shows a change of particle size distribution according to the premixing process and the premixing time (FIG. 3a) and a change of particle size of D50 and D90 according to the progress of process (FIG. 3b).

The premixed carbon nanotube paste was introduced into a screw mixer. The discharging rate of the screw mixer was 0.5 kg/min, and the viscosity of the mixed solution of the carbon nanotube discharged was 22,000 cps.

TABLE 2

| Mixing Step | Content of solids (%) | Mixing Time | RPM (H/L) | D50/D90 (μm) | Dispersion Effect |
|---|---|---|---|---|---|
| First (Kneading) | 8.89 | 30 min | 1500/160 | 39.6/89.1 | — |
|  | 8.44 | +30 min (1.0 h) |  | 15.1/46.1 | D50/D90 reduction |
|  |  | +30 min (1.5 h) |  | 14.1/45.7 | — |
|  | 8.04 | +30 min (2.0 h) |  | 13.7/47.3 | — |
| Second (Paste) | 5.62 | +30 min (2.5 h) | 1100/140 | 7.3/38.7 | — |
|  |  | +30 min (3.0 h) |  | 7.0/34.2 | D50/D90 reduction |
|  |  | +30 min (3.5 h) |  | 7.3/38.6 | — |
| Third (Dilution) | 2.40 | +30 min (4.0 h) | 500/60 | 7.0/37.2 |  |

EXAMPLE 3

Carbon nanotube pellets prepared by extruding the paste produced in Example 2 and distilled water were mixed for 2 hours to prepare a first paste (Kneading). Then, distilled water was added to the first paste and mixed them for 1.5 hours to prepare a second paste (Paste). Distilled water was further added to the second paste and the mixture was diluted to some extent (Dilution). Thus, premixing process of the carbon nanotubes was carried out. The viscosity of the premixed carbon nanotube paste was 20,000 cps. Table 3 shows the particle size of the carbon nanotubes according to the steps of the premixing process and the mixing time in each step. FIG. 4 shows a change of particle size distribution according to time of the premixing process (FIG. 4a) and a change of particle size of D50 and D90 according to the progress of process (FIG. 4b).

The premixed carbon nanotube paste was introduced into a screw mixer. The discharging rate of the screw mixer was 0.5 kg/min, and the viscosity of the mixed solution of the carbon nanotube discharged was 9.000 cps.

TABLE 3

| Mixing Step | Content of solids (%) | Mixing Time | RPM (H/L)[a] | D50/D90 (μm) | Dispersion Effect |
|---|---|---|---|---|---|
| First (Kneading) | 8.89 | 30 min | 1500/160 | 18.1/43.4 | — |
|  |  | +30 min (1.0 h) |  | 13.4/36.2 | D50/D90 reduction |
|  |  | +30 min (1.5 h) |  | 11.7/34.0 | D50/D90 reduction |
|  |  | +30 min (2.0 h) |  | 10.4/32.1 | D50/D90 reduction |
| Second (Paste) | 5.62 | +30 min (2.5 h) | 1100/140 | 5.4/23 | — |
|  |  | +30 min (3.0 h) |  | 5.4/23 | D50/D90 reduction |
|  |  | +30 min (3.5 h) |  | 5.5/24 | — |
| Third (Dilution) | 2.40 | +30 min (4.0 h) | 500/60 | 5.6/23.7 |  |

[a]RPM H/L: rpm of the vertical direction/rpm of the horizontal direction

EXPERIMENTAL EXAMPLE 2: CHANGES IN PARTICLE SIZE AND VISCOSITY DURING PELLETIZING OF CNT POWDERS AND OF PRESSED CNTs

Table 4 and FIG. 5 show changes in particle size in the premixing of Example 2 and Example 3 in order to compare the particle size change and the viscosity characteristics with use of CNT powders and compressed CNTs in the production of carbon nanotube pellet. Table 6 shows a particle size distribution (FIG. 6a) of the premixed carbon nanotube and the SEM image (FIG. 6b) of the shape of the carbon nanotubes after discharging from the screw mixer.

FIG. 8 shows particle sizes and shapes of distributions of CNTs (FIG. 8a) and pressed CNTs (FIG. 8b) after premixing process.

The first discharged carbon nanotube paste was reintroduced into the screw mixer and discharged at a discharge rate of 2.0 kg/min. The viscosity and the particle size of the carbon nanotube paste which is second discharged are shown in Table 5.

FIG. 7 shows a graph of the particle size distribution of each step (FIG. 7a) and the SEM image of the shape of distribution of the carbon nanotubes (FIG. 7b).

TABLE 4

|           | Particle size (D50/D90, μm) | | | | Viscosity | |
| --- | --- | --- | --- | --- | --- | --- |
|           | First | Second | Third | [b] S/M | (cps) @ 12 rpm | |
|           | (Kneading) (2.0 hr) | (Paste) (5 hr) | (Dilution) (0.5 hr) | 1 Pass (0.5 Kg/min) | Pre-mixing | S/M 1 pass (0.5 Kg/min) |
| Example 2 | 13.7/47.3 | 7.3/38.6 | 7.0/37.2 | 7.17/26 | 7000 | 22000 |
| Example 3 | 10.4/32.1 | 5.5/24 | 5.6/23.7 | 5.9/20.5 | 2000 | 9000 |

[b]S/M 1 Pass: First discharging process from the screw mixer

According to Table 4 and FIG. 5, when compressed CNTs, i.e., pelletized carbon nanotubes are used, the particle size of the CNTs in the premixing step is smaller than that of uncompressed CNTs, which means that the particle size of the CNTs is reduced by the pelletizing process. However, in the kneading step, which is an initial first kneading process, the CNT particles discharged from the screw mixer are observed to be larger than the uncompressed CNT particles, which may be due to agglomeration of the compressed CNT particles in the extrusion process. In the second and third steps, the particle size gradually decreases and remains almost constant. This is considered to be due to disassembling of the CNT particles agglomerated by the compression process. In addition, the viscosity in the premixing and the viscosity after the S/M discharging for Example 3 by using compressed CNTs were significantly decreased as compared with Example 2. These properties may allow to improve the dispersion property of CNT in the process. This may be an effect of increasing the density of each of the CNTs as the particle size of the CNTs having the same mass is reduced by the compression process.

EXPERIMENTAL EXAMPLE 3: INCREASE OF DISCHARGING RATE

Carbon nanotube pellets prepared by extruding the paste produced in Example 2 and distilled water were mixed for 2 hours to prepare a first paste (Kneading). Then, distilled water was added to the first paste and mixed them for 1.5 hours to prepare a second paste (Paste). Distilled water was further added to the second paste and the mixture was diluted to some extent (Dilution). Thus, premixing process of the carbon nanotubes was carried out. The particle size and the viscosity of the premixed carbon nanotube paste are shown in Table 5.

The premixed carbon nanotubes were introduced into a screw mixer and discharged at a discharge rate of 2.0 kg/min. The viscosity and the particle size of the carbon nanotube paste which is first discharged are shown in Table 5.

TABLE 5

|  | Particle size (μm) | | Viscosity (cps) |
| --- | --- | --- | --- |
|  | D50 | D90 | @12 rpm |
| Premixing | 5.61 | 23.7 | 2000 |
| S/M 1Pass | 6.34 | 27.8 | 5250 |
| S/M 2Pass | 6.19 | 22.5 | 6333 |

As shown in Table 5, the change of the particle size according to the repetition of the discharging process does not appear much, and the tendency of the particle size of D90 to decrease slightly may appear due to the effect of disassembling of agglomerates by the stirring and mixing. In addition, as the discharging rate increases, the dispersion characteristics of the carbon nanotubes may deteriorate, which may be attributable to an increase in viscosity of paste.

EXPERIMENTAL EXAMPLE 4: COMPARISON OF THE CHANGE OF THE PARTICLE SIZE WITH OR WITHOUT PREMIXING PROCESS

EXAMPLE 4

Carbon nanotube powders and distilled water were mixed for a predetermined time. The mixture was introduced into a screw mixer and mixed for a predetermined time. Then, the mixture was first extruded with an extruder to prepare pellets.

The first extruded pellets were mixed with distilled water again. The mixture was introduced into the screw mixer and mixed for a predetermined time. Then, the mixture was second extruded with the extruder to prepare pellets. The second extruded pellets were mixed with distilled water again. The mixture was introduced into the screw mixer and mixed for a predetermined time. Then, the mixture was third extruded with the extruder to prepare pellets.

The particle sizes of the carbon nanotubes contained in the pellets in each of the first, second and third extrusion steps were measured and the results are shown in Table 6 below. The particle size in each step was measured by dispersing each pellet in an NMP solution.

FIG. 9 shows a comparison of the particle size distributions according to the number of times of passing through the extruder.

EXAMPLE 5

Carbon nanotubes and distilled water were mixed for 2 hours to prepare a first paste (Kneading). Then, distilled water was added to the first paste and mixed them for 1.5 hours to prepare a second paste (Paste). Distilled water was further added to the second paste and the mixture was diluted to some extent (Dilution). Thus, premixing process of the carbon nanotubes was carried out. The premixed solution of carbon nanotubes was introduced into a screw mixer, mixed for 30 minutes, and then extruded with an extruder to prepare pellets.

The first extruded pellets were mixed with distilled water again. The mixture was introduced into the screw mixer and mixed for a predetermined time. Then, the mixture was second extruded with the extruder to prepare pellets. The second extruded pellets were mixed with distilled water again. The mixture was introduced into the screw mixer and mixed for a predetermined time. Then, the mixture was third extruded with the extruder to prepare pellets.

The particle sizes of the carbon nanotubes contained in the pellets in each of the first, second and third extrusion steps were measured and the results are shown in Table 6 below. The particle size in each step was measured by dispersing each pellet in an NMP solution.

FIG. 8 shows shapes of distributions of CNTs (FIG. 8*a*) and pressed CNTs (FIG. 8*b*) after premixing process.

FIG. 10 shows the particle size distribution according to the number of times of passing through the extruder of the premixed CNTs.

TABLE 6

|  | Example 4 | | Example 5 | |
| --- | --- | --- | --- | --- |
|  | D50 (μm) | D90 (μm) | D50 (μm) | D90 (μm) |
| Powder | 419 | 664 | 7.3 | 36.7 |
| 1$^{st}$ passing | 184 | 528 | 5.6 | 22.6 |
| 2$^{nd}$ passing | 120 | 265 | — | — |
| 3$^{rd}$ passing | 90 | 194 | 5.9 | 26.6 |

As shown in Table 6, in the case of the pelletized carbon nanotubes without the premixing, the initial particle size of the carbon nanotubes gradually decreases in proportion to the number of times of passing through the extruder. However, in the case of the carbon nanotubes which have passed through the extruder after premixing, the change of the particle size according to the passage of the extruder does not appear much. This indicates that in the premixing process the agglomerates of the carbon nanotubes which were physically aggregated are sufficiently disassembled and the carbon nanotubes in the disassembled state are pelletized, so that the change of the particle size according to the passage of the extruder can be small or almost not. On the other hand, in the pelletizing process without the premixing, the agglomerates of the carbon nanotubes are compressed, so that the size of the agglomerates may be decreased according to the number of times of passing through the extruder. Therefore, the particle size tends to decrease according to the number of times of passing through the extruder. For example, D90 of the particle size of the carbon nanotubes may satisfy the following Expression 2:

$$-167.3x+650 \leq y \leq -167.3x+670 \quad \text{[Expression 2]}$$

wherein x is the number of times of extrusion of the carbon nanotubes, and y is the particle size of D90 (μm) of the carbon nanotubes.

While specific embodiments of the invention have been described in detail, it will be appreciated by those skilled in the art that such detailed descriptions are merely preferred embodiments and the scope of the present invention is not limited thereto. Therefore, the true scope of the present invention should be defined by the appended claims and their equivalents.

INDUSTRIAL APPLICABILITY

The carbon nanotube pellets produced by the method for producing carbon nanotube pellets according to the present invention can improve the problems of scattering of powders. Also, although the carbon nanotubes in the form of pellets have a high compression ratio over the apparent density of the initial carbon nanotubes, the dispersibility to the solvent is excellent so that the productivity can be improved in the production of the carbon nanotube composite material.

What is claimed is:

1. A method for producing carbon nanotube pellets comprising the steps of:
   mixing carbon nanotubes and a solvent to form a first carbon nanotube mixture;
   extruding the first carbon nanotube mixture into first pellets;
   mixing the first pellets with the solvent to form a second carbon nanotube mixture; and
   extruding the second carbon nanotube mixture into second pellets.

2. The method for producing carbon nanotube pellets according to claim 1, wherein a particle size of the carbon nanotubes contained in the pellets is decreased in proportion to the number of times of extrusion.

3. The method for producing carbon nanotube pellets according to claim 2, wherein a decreasing ratio of D90 of the carbon nanotubes according the number of times of extrusion satisfies the following Expression 2:

$$-167.3x+650 \leq y \leq -167.3x+670 \quad \text{[Expression 2]}$$

wherein x is the number of times of extrusion of the carbon nanotubes, and y is D90 in μm of the carbon nanotubes.

4. The method for producing carbon nanotube pellets according to claim 1, wherein the method comprises the steps of:
   premixing the carbon nanotubes and the solvent;
   mixing the premixed solution of carbon nanotubes in a screw mixer; and
   transferring the mixed solution of carbon nanotubes from the screw mixer to an extruder and extruding the mixture into pellets.

5. The method for producing carbon nanotube pellets according to claim 4, wherein the method further comprises the steps of:
   mixing carbon nanotubes and a solvent to prepare a first premixture as a first step;
   adding additional predetermined solvent to the first premixture to prepare a second premixture as a second step; and
   adding a solvent to the second premixture to prepare a premixed solution.

6. The method for producing carbon nanotube pellets according to claim 5, wherein the time to complete the first step and the second step is 2 hours or less, respectively.

7. The method for producing carbon nanotube pellets according to claim 5, wherein an average particle size of the carbon nanotubes after the first step is 20 µm or less.

8. The method for producing carbon nanotube pellets according to claim 4, wherein D90 of the carbon nanotubes contained in the carbon nanotube pellets produced by the method is 50 µm or less.

9. The method for producing carbon nanotube pellets according to claim 1, wherein the solvent is at least one selected from the group consisting of water, alcohols, ketones, amides, esters, ethers, aromatic hydrocarbons such as benzene or toluene, and aliphatic hydrocarbons.

10. The method for producing carbon nanotube pellets of claim 9, wherein the solvent is hexane or heptane.

\* \* \* \* \*